(12) United States Patent
Kim et al.

(10) Patent No.: US 10,754,547 B2
(45) Date of Patent: Aug. 25, 2020

(54) APPARATUS FOR MANAGING DISAGGREGATED MEMORY AND METHOD THEREOF

(71) Applicant: ELECTRONICS AND TELECOMMUNICATIONS RESEARCH INSTITUTE, Daejeon (KR)

(72) Inventors: Kang Ho Kim, Daejeon (KR); Kwang Won Koh, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/162,107

(22) Filed: Oct. 16, 2018

(65) Prior Publication Data

US 2019/0114079 A1    Apr. 18, 2019

(30) Foreign Application Priority Data

Oct. 16, 2017  (KR) .................. 10-2017-0133929
Oct. 15, 2018  (KR) .................. 10-2018-0122434

(51) Int. Cl.
*G06F 12/123*      (2016.01)
*G06F 3/06*        (2006.01)
(Continued)

(52) U.S. Cl.
CPC ............ *G06F 3/0604* (2013.01); *G06F 3/064* (2013.01); *G06F 3/0676* (2013.01);
(Continued)

(58) Field of Classification Search
None
See application file for complete search history.

(56) References Cited

U.S. PATENT DOCUMENTS 9,336,141 B2 *  5/2016  Waldspurger ....... G06F 12/0802
9,418,020 B2 *  8/2016  Waldspurger ....... G06F 12/0893
(Continued)

FOREIGN PATENT DOCUMENTS

KR    1020150062634 A    6/2015
KR    1020150143918 A   12/2015
KR       101740490 B1    5/2017

OTHER PUBLICATIONS

Abel Gordon et al., "Ginkgo: Automated, Application-Driven Memory Overcommitment for Cloud Computing", Jan. 2011.
(Continued)

*Primary Examiner* — Brian R Peugh

(57) ABSTRACT

Disclosed is a method of managing a disaggregated memory. According to the present disclosure, the method includes: assigning at least one memory page to a local memory and a remote memory; checking a request for access to the memory page; checking whether a target performance ratio required in service is satisfied or not when the memory page requested to be accessed is assigned to the remote memory; predicting a size of the local memory on the basis of an LRU distance-based histogram when the target performance ratio is not satisfied; and reassigning the memory page requested to be accessed in consideration of the predicted size of the local memory.

16 Claims, 5 Drawing Sheets

(51) Int. Cl.
*G06F 9/455* (2018.01)
*G06F 12/02* (2006.01)

(52) U.S. Cl.
CPC ........ *G06F 3/0679* (2013.01); *G06F 9/45558* (2013.01); *G06F 12/02* (2013.01); *G06F 12/123* (2013.01); *G06F 2009/45583* (2013.01)

(56) References Cited

U.S. PATENT DOCUMENTS

| | | |
|---|---|---|
| 2014/0173227 A1* | 6/2014 | Min .................. G06F 3/0673 711/159 |
| 2017/0111207 A1 | 4/2017 | Yoon |
| 2017/0141944 A1 | 5/2017 | Lee et al. |

OTHER PUBLICATIONS

Weiming Zhao et al., "Dynamic Memory Balancing for Virtual Machines", VEE'09, Mar. 11-13, 2009, ACM.

* cited by examiner

APPARATUS FOR MANAGING DISAGGREGATED MEMORY AND METHOD THEREOF

CROSS REFERENCE TO RELATED APPLICATION

The present application claims priority to Korean Patent Application Nos. 10-2017-0133929 and 10-2018-0122434, filed Oct. 16, 2017 and Oct. 15, 2018, the entire contents of which are incorporated herein for all purposes by this reference.

BACKGROUND OF THE INVENTION

Field of the Invention

The present disclosure relates generally to a computing system. More particularly, the present disclosure relates to a method and apparatus for controlling a size of a memory assigned to a virtual machine.

Description of the Related Art

As networking technology develops, a cloud system in which computing resources are shared is provided. The cloud system may be configured in such a manner that various physical infrastructures are shared with multiple users. The physical infrastructures may include one or more computing systems having processors, memories, storages, networking, and the like.

In order to implement or execute the workload required by an application program, it is necessary to use the physical infrastructures. However, the physical infrastructures are required to be shared within the cloud system, and thus the cloud system manages the physical infrastructures for implementing or executing the workload required by the application program, via a logical server or a virtual machine (VM).

Furthermore, due to increase in data intensive workloads such as an in-memory database, data caching, bioinformatics, and graph processing, the capacity of the memory required in the cloud system increases.

According to this trend, provided is a large capacity type of cloud system in which a memory of 1 TB or more is available in a single virtual machine (VM).

The foregoing is intended merely to aid in the understanding of the background of the present disclosure, and is not intended to mean that the present disclosure falls within the purview of the related art that is already known to those skilled in the art.

SUMMARY OF THE INVENTION

As described above, in order to provide a large capacity type of cloud system, large capacity servers equipped with high number of cpu cores and large capacity of memory are required, but it is costly to construct such an infrastructure consisting of the large servers.

In order to support the large capacity memory using the commodity volume server, used is a disaggregated memory structure technology in which memories distributed among different physical computing devices (for example, severs) operate as a single memory.

The present disclosure is intended to propose an apparatus and method capable of efficiently managing a memory in a disaggregated memory structure.

Also, the present disclosure is intended to propose an apparatus and method capable of managing a memory and guaranteeing a contractual performance required by a cloud system configured in a disaggregated memory structure.

Also, the present disclosure is intended to propose an apparatus and method providing a memory which is capable of guaranteeing a required, contractual performance through LRU distance-based performance prediction.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided a method of managing a disaggregated memory, the method including: assigning at least one memory page to a local memory and a remote memory; checking a request for access to the memory page; checking whether a target performance ratio required in service is satisfied or not when the memory page requested to be accessed is assigned to the remote memory; predicting a size of the local memory on the basis of an LRU distance-based histogram when the target performance ratio is not satisfied; and reassigning the memory page requested to be accessed in consideration of the predicted size of the local memory.

According to another aspect of the present disclosure, there is provided an apparatus for managing a disaggregated memory, the apparatus including: a disaggregated memory unit including a local memory provided in a computing device in a local area and a remote memory provided in a computing device in a remote area; a memory virtual machine unit managing at least one memory page required to build or execute an application program; a memory hypervisor unit provided between the disaggregated memory unit and the memory virtual machine unit, the memory hypervisor unit assigning the at least one memory page to the local memory and the remote memory; and a performance prediction unit checking a request for access to the memory page, checking whether a target performance ratio required in service is satisfied or not when the memory page requested to be accessed is assigned to the remote memory, and predicting a size of the local memory on the basis of an LRU distance-based histogram when the target performance ratio is not satisfied.

According to still another aspect of the present disclosure, there is provided an apparatus for managing a disaggregated memory, the apparatus including: a disaggregated memory unit including a local memory provided in a computing device in a local area and a remote memory provided in a computing device in a remote area; a memory virtual machine unit managing at least one memory page required to build or execute an application program; and a memory hypervisor unit provided between the disaggregated memory unit and the memory virtual machine unit, the memory hypervisor unit configured to: assign the at least one memory page to the local memory and the remote memory; check a request for access to the memory page; check whether a target performance ratio required in service is satisfied or not when the memory page requested to be accessed is assigned to the remote memory; predict a size of the local memory on the basis of an LRU distance-based histogram when the target performance ratio is not satisfied; and reassign the memory page requested to be accessed in consideration of the predicted size of the local memory.

It is to be understood that the foregoing summarized features are exemplary aspects of the following detailed description of the present disclosure without limiting the scope of the present disclosure.

According to the present disclosure, in the disaggregated memory structure, an apparatus and method capable of efficiently managing the memory may be provided.

Also, according to the present disclosure, it is possible that a contractual performance required in the cloud system configured in the disaggregated memory structure is guaranteed while the memory is managed.

Also, according to the present disclosure, a memory capable of guaranteeing a required, contractual performance through LRU distance-based performance prediction may be provided.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
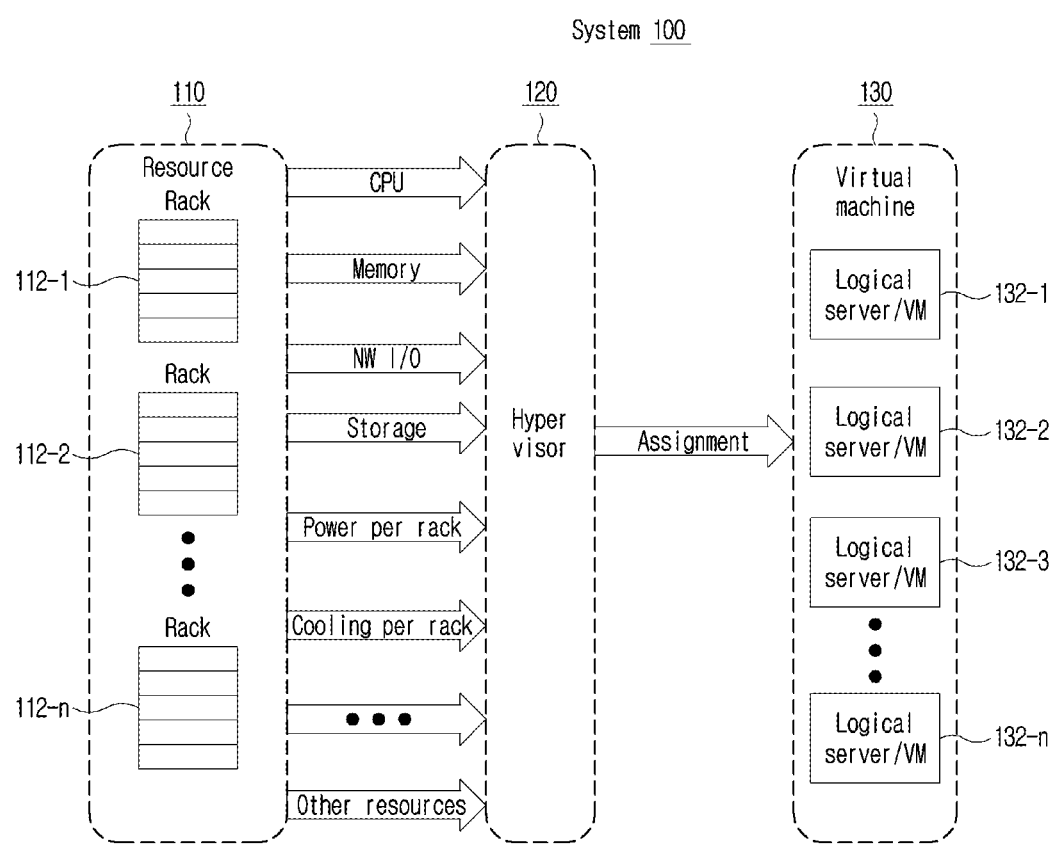
FIG. 1 is a diagram illustrating a system to which an apparatus for managing a disaggregated memory is applied according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween.

Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinbelow, exemplary embodiments of the present disclosure will be described in detail with reference to the accompanying drawings.

FIG. 1 is a diagram illustrating a system to which an apparatus for managing a disaggregated memory is applied according to an embodiment of the present disclosure.

Referring to FIG. 1, the system 100 to which an apparatus for managing a disaggregated memory is applied includes a resource 110, a hypervisor 120, and a virtual machine 130.

The resource 110 may include multiple racks 112-1, 112-2, . . . , and 112-n. Each of the racks 112-1, 112-2, . . . , and 112-n may include various computing resources. The computing resources may include various types of physical resources. For example, the physical resources may include a CPU, a memory (for example, a Random access memory (RAM)), a storage (for example, a hard disk or a solid state drive), a NW I/O device (for example, a network interface card), a power device (for example, a power brick, a cooling device (for example, a fan or a cooler), or other types of resources (for example, a network switch device).

These computing resources may be used via the hypervisor 120 (for example, a resource manager or a controller). The hypervisor 120 may be assigned to the virtual machine 130 by the resource manager, the controller, a scheduler, or the like of the system 100. Particularly, the hypervisor 120 may calculate scores of multiple computing resources and may evaluate the rankings of respective computing resources. The evaluation of the rankings of the computing resources may be performed with respect to factors which are capable of satisfying power, performance, costs, availability, or maintenance requirements.

The hypervisor 120 may monitor multiple operation attributes of respective computing resources so as to configure or deploy the virtual machine 130 while the virtual machine 130 implements, performs, or executes the workload.

Also, the hypervisor 120 may assign the computing resources to the virtual machine 130 on the basis of the scores of the computing resources. For example, the hypervisor 120 may implement the load required in the previous work or may evaluate the ranking of the operation score compared to the past operation scores determined with respect to one or more other portions of the computing resources. Specifically, when the ranking of a first computing resource is evaluated as lower than those of past operation scores of other computing resources, the hypervisor 120 replaces the first computing resource with a new computing resource.

In the meantime, the virtual machine 130 may include multiple logical servers or virtual machines 132-1, 132-2, . . . , and 132-*m*. For example, the logical servers or virtual machines 132-1, 132-2, . . . , and 132-*m* may be configured to implement or execute the workload. Each logical server required in the virtual machine 130 may include one or more virtual machines. A portion of the computing resource may be assigned to each virtual machine. As another example, the computing resource may be directly assigned to a particular virtual machine.

Moreover, the memory for the computing resource may be provided in a disaggregated memory structure. Here, the disaggregated memory structure may include multiple memories distributed among physically different devices (for example, server devices). On the basis of a location in which the memory is provided, the multiple memories may be classified into a local memory located in the same apparatus as the apparatus on which computing is performed and a remote memory located in a different remote apparatus from the apparatus on which computing is performed.

This disaggregated memory structure may solve the problem of memory usage imbalance by providing the memory which is not used by the device to another device in a dynamic manner, and may also increase a memory usage. Moreover, as described above, by sharing the memory with multiple devices, even though there is no a large capacity memory available locally by multiple devices, it is possible that a large capacity memory is used.

Figure 2:
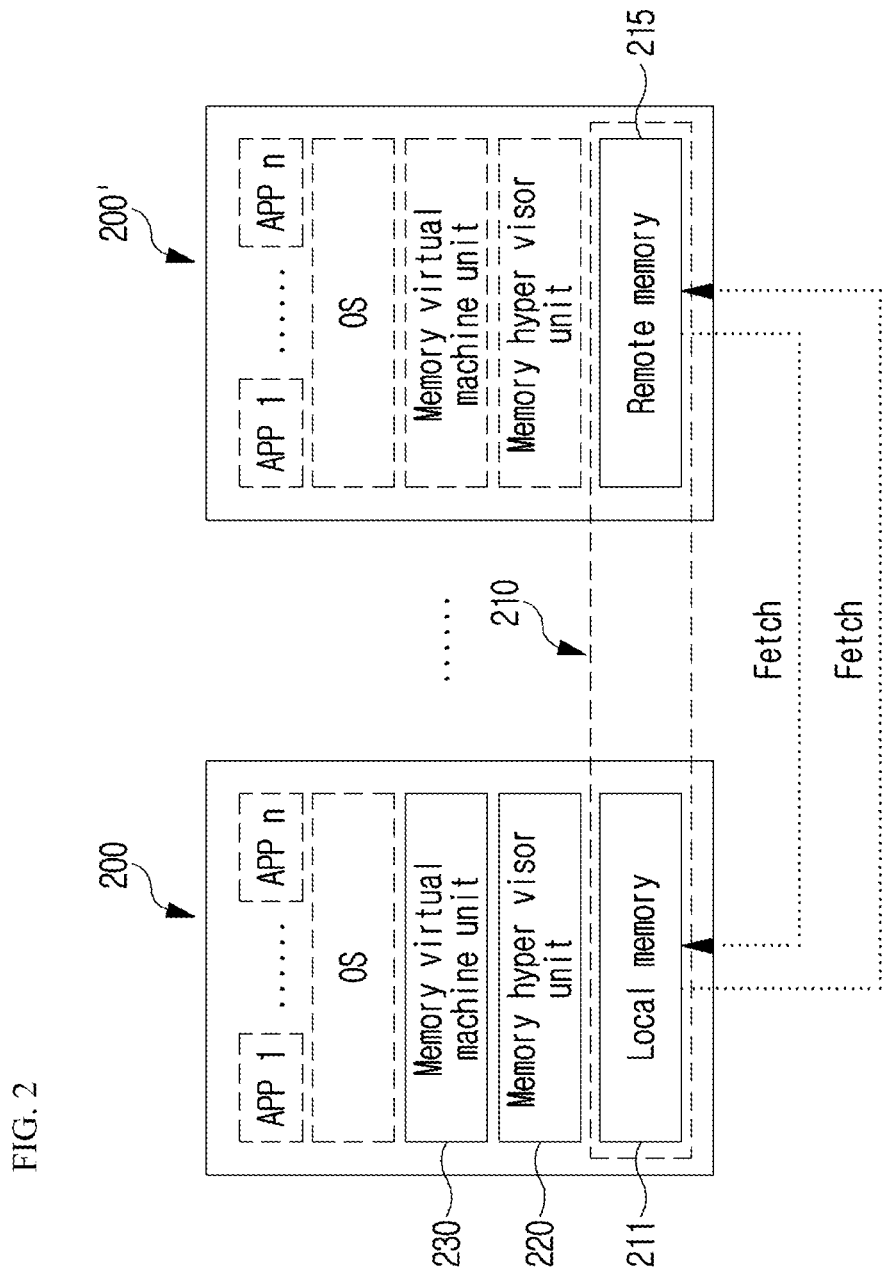
FIG. 2 is a block diagram illustrating a structure of an apparatus for managing a disaggregated memory according to an embodiment of the present disclosure.

FIG. 2 is a block diagram illustrating a structure of an apparatus for managing a disaggregated memory according to an embodiment of the present disclosure.

The apparatus for managing the disaggregated memory according to the embodiment of the present disclosure may be configured on the basis of the system 100 in FIG. 1.

As described above, although the physical resources may include the CPU, the memory (for example, the random access memory (RAM)), the storage (for example, the hard disk or the solid state drive), the NW I/O device (for example, the network interface card), the power device (for example, the power brick), the cooling device (for example, the fan or the cooler), or other types of resources (for example, network switch device), the apparatus for managing the disaggregated memory is an apparatus for managing the memory among the various physical resources and may include a configuration required in memory management.

Referring to FIG. 2, the apparatus 200 for managing the disaggregated memory may include a disaggregated memory unit 210, a memory hypervisor unit 220, and a memory virtual machine unit 230.

The disaggregated memory unit 210 may include a local memory 211 located in the same apparatus 200 as the apparatus on which computing is performed and a remote memory 215 located in a remote apparatus 200' different from the apparatus on which computing is performed.

The memory hypervisor unit 220 may perform memory management in such a manner that the memory virtual machine unit 230 identifies the local memory 211 and the remote memory 215 in the disaggregated memory unit 210 as a single memory.

The memory hypervisor unit 220 may eliminate complexity of accessing the remote memory 215 through remote memory access on a per-page basis. Specifically, the memory hypervisor unit 220 generates a page fault when a memory page requested to be accessed by the memory virtual machine unit 230 is not present in the local memory 211, and fetches the remote memory 215 to a local page through page fault processing. Then, the memory hypervisor unit 220 may assign the fetched local page to the memory virtual machine unit 230 in which the page fault has occurred for management. Accordingly, the memory virtual machine unit 230 accesses the fetched local page for processing, when access to the relevant memory is required.

As another example, when there is no page available in the local memory 211, the memory hypervisor unit 220 evicts a local memory page to the remote memory 215 so that the local memory page is obtained.

Moreover, it is necessary that the memory hypervisor unit 220 monitors the size of the memory used in the memory virtual machine unit 230 and predicts the size of the memory required by the memory virtual machine unit 230 so as to smoothly provide the memory of the capacity required by the memory virtual machine unit 230.

Hereinafter, an operation of the memory hypervisor unit 220 for predicting the size of the memory will be described in detail.

An operation system or an application program may be executed via the memory virtual machine unit 230. In execution of the application program, application program execution time may increase in proportion to the number n of times that the remote memory 215 is accessed.

On the basis of this, the application program execution time T(n) of the number n of times that the remote memory 215 is accessed may be expressed as Equation 1 below.

$$T(n) = L + (A \times n) \quad \text{[Equation 1]}$$

Here, L denotes the application program execution time in the memory virtual machine unit 230 when the local memory 211 is sufficient, A denotes the average time that it takes to access the remote memory 215, and n denotes the number of times that the remote memory 215 is accessed.

The application program execution time L is a fixed value not related to n, and the value may be checked after executing the application program. The application program execution time L may be expressed in Equation 2 below using a memory monitoring time period P, the number N of times that the remote memory 215 is accessed, the average time A required to access the remote memory 215, and the like.

$$L = P - (A \times N) \quad \text{[Equation 2]}$$

In the meantime, a performance degradation ratio may be expressed as Equation 3 below.

$$1 - (P - A \times N)/P \quad \text{[Equation 3]}$$

Since the application program execution time L is found using Equation 2, it is put into Equation 1 and the application program execution time according to n is calculated as Equation 4 below.

$$T(n) = L + (A \times n) = (P - (A \times N)) + (A \times n) = P - A(N - n) \quad \text{[Equation 4]}$$

In the meantime, in providing a service (for example, a cloud service), it is necessary that a performance ratio (hereinafter, referred to as "a target performance ratio") required in the service (for example, the cloud service) is guaranteed, so that the memory hypervisor unit 220 needs to consider the target performance ratio in predicting the size of the memory.

The target performance ratio α indicates a performance ratio guaranteed in the service and may be set to a value in a range of zero to one. For example, when the target performance ratio α is at a value of 0.9, it means that the performance of the application program executed in the memory virtual machine unit 230 is guaranteed to be at least 90% or more, compared to the case in which the entire memory in a contract for the service is assigned to the memory virtual machine unit 230.

On the basis of this, it is necessary that the memory hypervisor unit 220 measures the performance of the application program to guarantee the contractual performance of the service and predicts the size of the memory to be added so as to compensate for the insufficient performance.

In order to guarantee the target performance ratio α, the application program execution time needs to be equal to or less than L/α. In order to reduce the application program execution time by P−L/α, the number of times that the remote memory is accessed needs to be reduced by N−$n_t$ according to the relation shown in Equation 5 below.

$$N=T^{-1}(P),$$

$$n_t=T^{-1}(L/\alpha) \quad \text{[Equation 5]}$$

Referring to Equations 4 and 5, the number N−$n_t$ of times that the remote memory is accessed to be reduced is expressed as Equation 6 below.

$$N - n_t = \frac{P - \frac{P - (A \times N)}{\alpha}}{A} \quad \text{[Equation 6]}$$

In the meantime, the memory hypervisor unit 220 may calculate the size of the local memory 211 further needed to reduce the number of times that the remote memory is accessed by N−$n_t$.

Here, the memory hypervisor unit 220 may calculate the size of the local memory 211 further needed by using a page LRU distance histogram for the remote memory 215.

Specifically, among the memory pages assigned to the memory virtual machine unit 230, the memory hypervisor unit 220 may assign the frequently used memory page to the local memory 211 and may assign the not frequently used memory page to the remote memory 215.

Also, the memory hypervisor unit 220 may use the local memory 211 as a memory cache. The memory hypervisor unit 220 may calculate a LRU distance of the page evicted to the remote memory 215 and may generate a LRU distance histogram based on the calculated LRU distance.

For example, assuming that there are eight memory pages assigned to the memory virtual machine unit 230, the memory hypervisor unit 220 assigns four pages to the remote memory 215 and assigns four pages to the local memory 211.

Specifically, when the assigned memory pages are A, B, C, D, E, F, G, and H pages, the memory hypervisor unit 220 assigns the A, B, C, and D pages to the local memory 211 and assigns E, F, G, and H pages to the remote memory 215.

As shown in Table 1, when the memory virtual machine unit 230 accesses the E, A, D, F, C, and H pages in this order, the LRU distance to the remote memory 215 is calculated as shown in Table 1 below. In Table 1, the left of the letter string which represent pages indicates the MRU page in the LRU list, and the right of the letter string indicates the LRU page. The LRU distance value indicates the number of times that each location of the page of the remote memory 211 is accessed.

TABLE 1

| Access page | Local memory page | Remote memory page | LRU distance |
|---|---|---|---|
| — | ABCD | EFGH | 0000 |
| E | EABC | DFGH | 1000 |
| A | AEBC | DFGH | 1000 |
| D | DAEB | CFGH | 2000 |
| F | FDAE | BCGH | 2100 |
| C | CFDA | EBGH | 2200 |
| G | GCFD | AEBH | 2210 |

Figure 3:
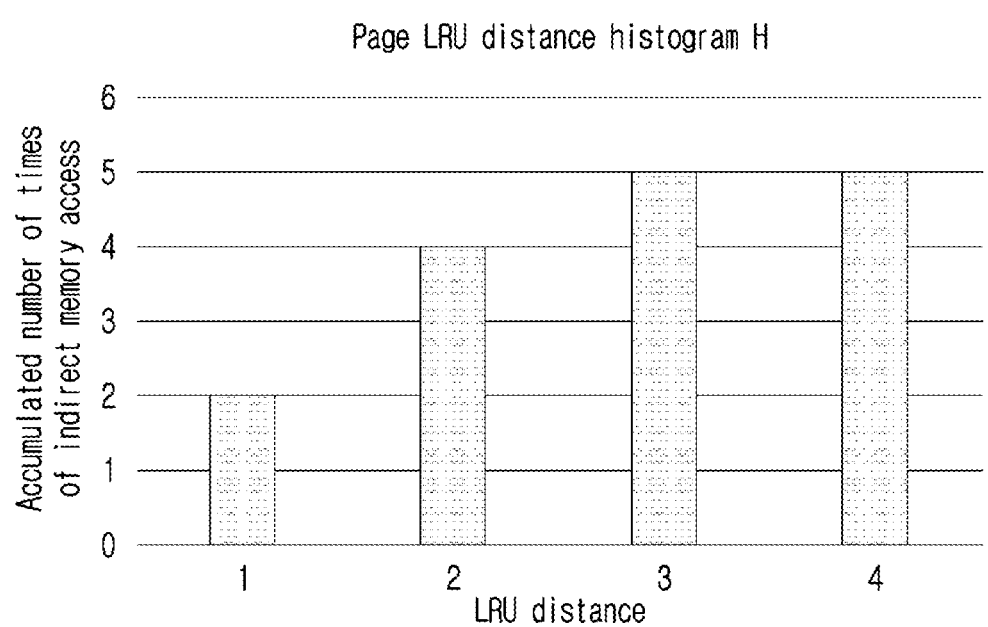
FIG. 3 is a diagram illustrating an LRU distance histogram generated by an apparatus for managing a disaggregated memory according to an embodiment of the present disclosure.

The memory hypervisor unit 220 may generate an LRU distance histogram shown in FIG. 3 by accumulating the LRU distance values in Table 1, and the LRU distance histogram may be expressed in a function form.

Moreover, a LRU distance histogram function H(c) may correspond to the number of times that the remote memory 215 is accessed, which is based on the LRU distance.

Access to the remote memory 215 may occur due to a shortage of the local memory 211 so that the number of times that the remote memory 215 is accessed may correspond to the amount of the shortage of the local memory 211. In other words, when the memory size c is assigned to the local memory 211 as much as the number of times that the remote memory 215 is accessed based on the LRU distance, access to the remote memory 215 does not occur. Therefore, the LRU distance histogram function H(c) is set equal to the number N−$n_t$ of times that the remote memory is accessed to be reduced, and from this, the amount of the shortage of the local memory 211. Namely, the size c of the local memory 211 to be added is set. On the basis of this, the memory hypervisor unit 220 may calculate the size c of the local memory 211 to be added with operation in Equation 7 below.

$$c=H^{-1}(N-n_t) \quad \text{[Equation 7]}$$

The LRU distance histogram function H(c), the average time A that it takes to access the remote memory 215, the number N of times that the remote memory 215 is accessed, and the like may be obtained by application program execution profiling, so that the memory hypervisor unit 220 continuously monitors performance degradation within a predetermined time period for performance prediction. On the basis of this, it is possible that the amount of the shortage of the local memory 211, namely, the size c of the local memory 211 to be added is predicted.

As described above, the memory hypervisor unit 220 performs an operation of predicting the size c of the local memory 211 to be added on the basis of Equations 1 to 7, but the present disclosure is not limited thereto. As another example, the apparatus 200 for managing the disaggregated memory may include a performance predictor 250 configured separately from the memory hypervisor unit 220. The performance predictor 250 may perform the operation of prediction the size c of the local memory 211 to be added on the basis of Equations 1 to 7.

In the meantime, the memory hypervisor unit 220 checks the size c of the local memory 211 to be added. When the remaining memory of the local memory 211 is at a value equal to or greater than the size c of the local memory 211 to be added, the memory page is assigned to the local memory. On the other hand, when the remaining memory of the local memory 211 is at a value smaller than the local memory 211 to be added, the memory hypervisor unit 220 enables the virtual machine to migrate to another node in which the local memory is sufficient.

In the meantime, the memory virtual machine unit 230 provides the size of the insufficient local memory to the memory hypervisor unit 220, so that even though the size of the local memory page assigned to the memory virtual machine unit 230 is greater than the working set size of the application program, the apparatus for managing the disaggregated memory does not identify this. In this case, the actual memory page used by the memory virtual machine unit 230 may be smaller than the memory page assigned to the memory virtual machine unit 230 so that the local memory use efficiency may be lowered.

In the embodiment of the present disclosure, when the memory virtual machine unit 230 does not access the remote memory for a predetermined period or when the vCPU usage of the virtual machine is low, the memory hypervisor unit 220 reduces the size of the page assigned to the local memory by a predetermined size γ (0<γ≤1).

As described above, even though the page assigned to the local memory is reduced by the predetermined size γ, the size of the local memory is checked and the memory page is reassigned periodically, every predetermined time, so that the local memory is obtained as much as required by the memory virtual machine unit 230.

Accordingly, the apparatus for managing the disaggregated memory may enhance the memory use efficiency by assigning the memory page adaptively according to the use state of the resource, and may assign the memory page stably through the prediction in size of the local memory.

Figure 4:
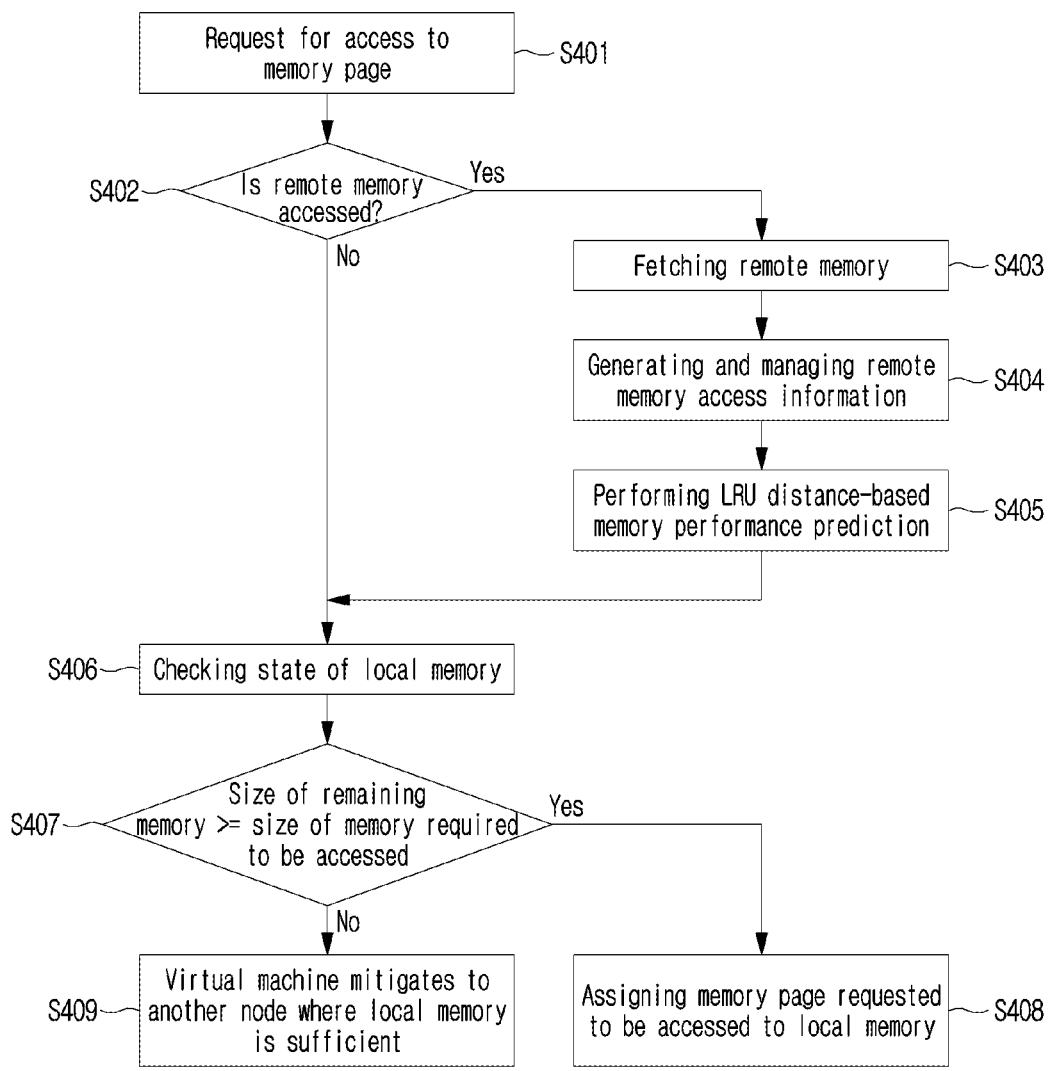
FIG. 4 is a flow chart illustrating a sequence of a method of managing a disaggregated memory according to an embodiment of the present disclosure.

FIG. 4 is a flow chart illustrating a sequence of a method of managing a disaggregated memory according to an embodiment of the present disclosure.

The method of managing the disaggregated memory may be performed by the apparatus for managing the disaggregated memory.

First, the apparatus for managing the disaggregated memory may receive a request from the virtual machine for accessing the memory page at step S401.

The memory in the apparatus for managing the disaggregated memory may be provided in the disaggregated memory structure. Here, the disaggregated memory structure may include multiple memories distributed among physically different devices (for example, the server device). On the basis of the location in which the memory is provided, the multiple memories may be classified into the local device located in the same apparatus as the apparatus on which computing is performed and a remote memory located in a different remote apparatus from the apparatus on which computing is performed.

On the basis of this, when the memory page requested to be accessed is the remote memory at step S402—Yes, the apparatus for managing the disaggregated memory fetches the remote memory page to the local memory page at step S403. Then, the apparatus for managing the disaggregated memory generates and manages remote memory access information informing that access to the remote memory occurs at step S404. Here, the remote memory access information may include a remote memory identifier, the time when the remote memory page is fetched, the number of times that the remote memory is accessed, and the like.

Next, the apparatus for managing the disaggregated memory may perform LRU distance-based memory performance prediction at step S405.

LRU distance-based memory performance prediction is an operation of predicting the size c of the local memory 21 to be added on the basis of Equations 1 to 7, and may be performed by the memory hypervisor of the apparatus for managing the disaggregated memory. As another example, LRU distance-based memory performance prediction may be performed by the performance predictor configured separately from the memory hypervisor.

LRU distance-based memory performance prediction will be described in detail in an operation related to FIG. 5 later.

In the meantime, when the memory page requested to be accessed is the local memory at step S402—No, the apparatus for managing the disaggregated memory proceeds to step S406.

At step S406, the apparatus for managing the disaggregated memory may check the state of the local memory 211 and may check whether the remaining memory of the local memory 211 is obtained as sufficiently as the size of the memory requested to be accessed. For example, the apparatus for managing the disaggregated memory may check whether the size of the remaining memory of the local memory 211 is at a value equal to or greater than the size of the memory requested to be accessed.

When the size of the remaining memory of the local memory 211 is at a value equal to or greater than the size of the memory required to be accessed at step S407—Yes, the apparatus for managing the disaggregated memory assigns the memory page requested to be accessed to the local memory at step S408. On the other hand, when the size of the remaining memory of the local memory 211 is at a value smaller than the size of the memory required to be accessed at step S407—No, the virtual machine migrates to another node in which the local memory is sufficient at step S409.

Figure 5:
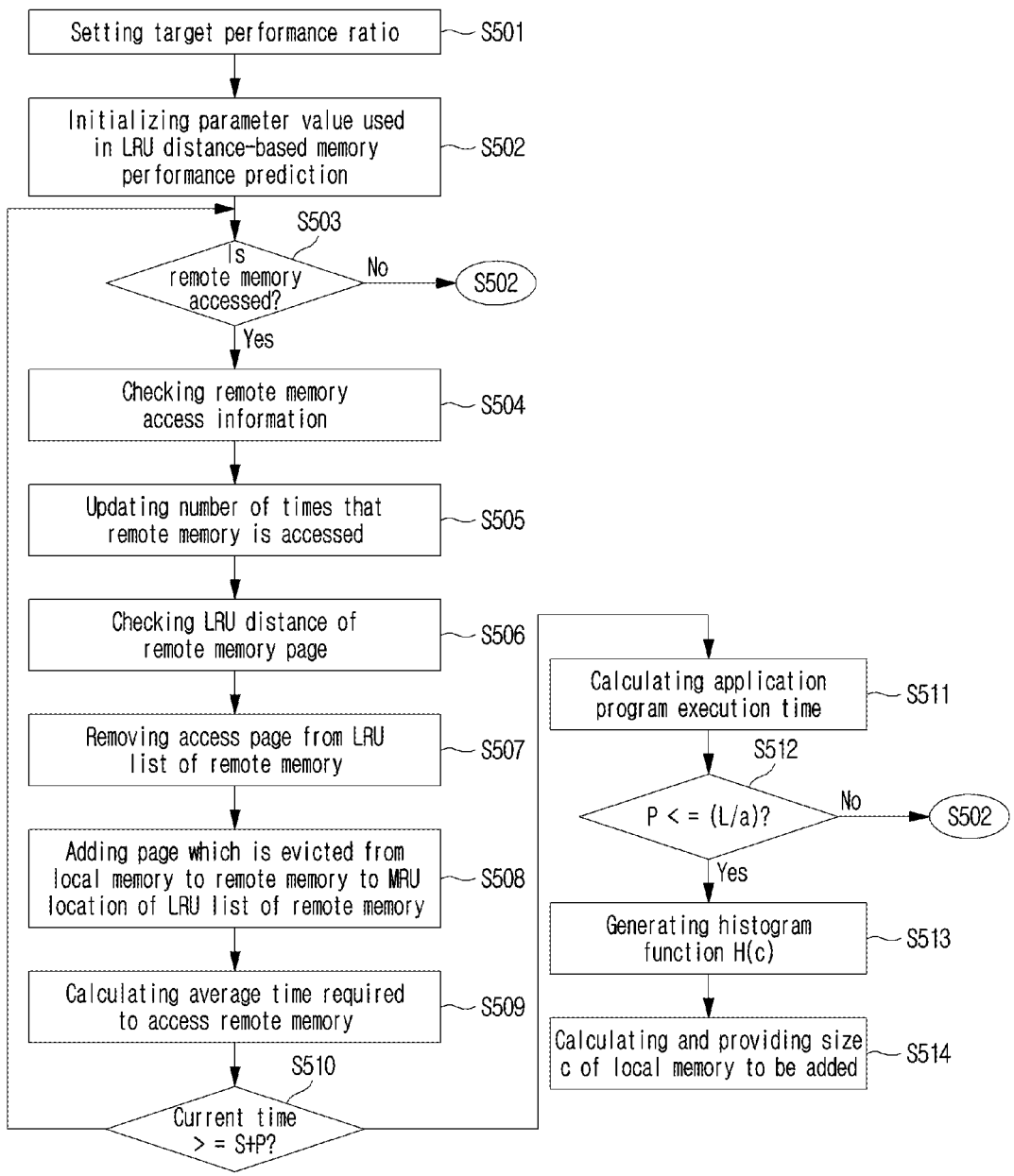
FIG. 5 is a flow chart illustrating a detailed sequence of a LRU distance-based memory performance prediction process in a method of managing a disaggregated memory according to an embodiment of the present disclosure.

FIG. 5 is a flow chart illustrating a detailed sequence of a LRU distance-based memory performance prediction process in a method of managing a disaggregated memory according to an embodiment of the present disclosure.

First, in providing the service (for example, the cloud service), it is necessary that a performance ratio (hereinafter, referred to as "a target performance ratio") required in the service (for example, the cloud service) is guaranteed, so that the apparatus for managing the disaggregated memory needs to consider the target performance ratio in predicting the size of the memory. On the basis of this, at step S501, the apparatus for managing the disaggregated memory may set the target performance ratio α. The apparatus for managing the disaggregated memory may provide an environment (for example, a user interface) in which the target performance ratio α is input, may receive the target performance ratio α using the environment, and may set the target performance ratio α.

Next, at step S502, the apparatus for managing the disaggregated memory may initialize parameter values (the start time S, the memory monitoring time period P, the LRU distance histogram function H, the average time A that it takes to access the remote memory 215, the number N of times that the remote memory 215 is accessed, and the like) to be used in LRU distance-based memory performance prediction.

Then, access to the local memory or the remote memory may be requested by the virtual machine. When a request for access to the remote memory occurs at step S503—Yes, the remote memory access information informing that access to the remote memory occurs may be generated and provided. Thus, the apparatus for managing the disaggregated memory may check the remote memory access information at step S504. Here, the remote memory access information may include the remote memory identifier, the time when the remote memory page is fetched, the number of times that the remote memory is accessed, and the like.

Then, the apparatus for managing the disaggregated memory may increase the number of times that the remote memory is accessed by one for an update at step S505. Then, the apparatus for managing the disaggregated memory checks the remote memory page requested to be accessed and the LRU distance of the remote memory page requested to be accessed at step S506.

Next, the apparatus for managing the disaggregated memory may remove the access page from the LRU list of the remote memory at step S507, and when the page evicted from the local memory to the remote memory is present, it is added to the MRU location of the LRU list of the remote memory at step S508.

Then, the apparatus for managing the disaggregated memory may calculate the average time A required to access the remote memory at step S509 considering the relation between the application program execution time L, the monitoring time period P, the number N of times that the remote memory is accessed, the average time A required to access the remote memory, and the like described in Equation 2.

Then, the apparatus for managing the disaggregated memory may compare the current time with the start time S and the monitoring time period P. When the current time is at a value equal to or greater than the sum of the start time S and the monitoring time period P at step S510—Yes, the apparatus for managing the disaggregated memory proceeds to step S511. When the current time is at a value smaller than the sum of the start time S and the monitoring time period P at step S510—No, the apparatus proceeds to step S503.

At step S511, the apparatus for managing the disaggregated memory may check the application program execution time L, and may calculate the application program execution time T(n) according to n on the basis of the description in Equation 4.

At step S512, the apparatus for managing the disaggregated memory may check whether the application program execution time L to which the target performance ratio $\alpha$ is applied (namely, the application program execution time L/target performance ratio $\alpha$) is at a value equal to or greater than the monitoring time period P.

When the application program execution time L to which the target performance ratio $\alpha$ is applied is at a value equal to or greater than the monitoring time period P, it means that the target performance is satisfied, so that the apparatus for managing the disaggregated memory proceeds to step S502 in which parameter values to be used in performance prediction are initialized.

On the other hand, when the application program execution time L to which the target performance ratio $\alpha$ is applied is at a value smaller than the monitoring time period P, it means that the target performance is not satisfied, so that the apparatus for managing the disaggregated memory proceeds to step S513.

At step S513, the apparatus for managing the disaggregated memory may generate the histogram function H c on the basis of the LRU distance value checked at step S506. Then, at step S514, the apparatus for managing the disaggregated memory may calculate and provide the size c of the local memory to be added, on the basis of a relation between the LRU distance histogram function H(c) and the number N-$n_r$ of times that the remote memory is accessed to be reduced.

In the meantime, in the apparatus for managing the disaggregated memory, the virtual machine provides the size of the insufficient local memory to the hypervisor, so that even though the size of the local memory page assigned to the virtual machine is greater than the working set size of the application program, the apparatus for managing the disaggregated memory does not identify this. In this case, the actual memory page used by the virtual machine may be relatively smaller than the memory page assigned to the virtual machine so that the local memory use efficiency may be lowered.

In the embodiment of the present disclosure, when the virtual machine does not access the remote memory for the predetermined period or the vCPU usage of the virtual machine is low, the apparatus for managing the disaggregated memory reduces the size of the page assigned to the local memory by the predetermined size $\gamma(0<\gamma\leq1)$.

As described above, even though the page assigned to the local memory by the predetermined size $\gamma$, the size of the local memory is checked and the memory page is reassigned periodically, every predetermined time, so that the local memory is obtained as much as required by the virtual machine.

Accordingly, the method of managing the disaggregated memory may enhance the memory use efficiency by assigning the memory page adaptively according to the use state of the resource, and may assign the memory page stably through the prediction in size of the local memory.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A method of managing a disaggregated memory, the method comprising:
assigning at least one memory page to a local memory and a remote memory;
checking a request for access to the memory page;
checking whether a target performance ratio required in service is satisfied or not when the memory page requested to be accessed is assigned to the remote memory;
predicting a size of the local memory on the basis of an LRU distance-based histogram when the target performance ratio is not satisfied; and
reassigning the memory page requested to be accessed in consideration of the predicted size of the local memory.

2. The method of claim 1, wherein the predicting of the size of the local memory comprises:
checking an LRU distance of the memory page requested to be accessed;
generating an LRU distance histogram by accumulating the LRU distances; and
predicting the size of the local memory in consideration of a relation between the LRU distance histogram and the number of times that the remote memory is accessed.

3. The method of claim 1, wherein the predicting of the size of the local memory comprises:
performing calculation corresponding to Equation 1 below $$C=H^{-1}(N-n_t) \quad \text{[Equation 1]}$$

wherein, in Equation 1, C denotes the predicted size of the local memory, H(c) denotes an LRU distance histogram function, and $N-n_t$ denotes the number of times that the remote memory is accessed to be reduced.

4. The method of claim 1, wherein the checking of whether target performance ratio is satisfied or not comprises:
comparing a ratio of application program execution time with the target performance ratio when the local memory based on a memory monitoring time period is sufficient; and
determining that the target performance ratio is satisfied when the local memory based on the memory monitoring time period is sufficient and the ratio of the application program execution time is at a value equal to or greater than the target performance ratio.

5. The method of claim 1, wherein the reassigning of the memory page requested to be assessed comprises:
checking a size of a remaining memory provided in the local memory;
comparing the predicted size of the local memory to the size of the remaining memory; and
reassigning the memory page requested to be accessed to the local memory in consideration of a result of comparison between the predicted size of the local memory and the size of the remaining memory.

6. The method of claim 1, further comprising:
counting an access resuming time after access to the remote memory occurs; and
reducing a size of the memory page assigned to the local memory by a predetermined size when the access resuming time exceeds a predetermined time.

7. The method of claim 1, further comprising:
monitoring a usage of a virtual processor; and
reducing a size of the memory page assigned to the local memory by a predetermined size in consideration of the usage of the virtual processor.

8. An apparatus for managing a disaggregated memory, the apparatus comprising:
a disaggregated memory unit including a local memory provided in a computing device in a local area and a remote memory provided in a computing device in a remote area;
a memory virtual machine unit managing at least one memory page required to build or execute an application program;
a memory hypervisor unit provided between the disaggregated memory unit and the memory virtual machine unit, the memory hypervisor unit assigning the at least one memory page to the local memory and the remote memory; and
a performance prediction unit checking a request for access to the memory page, checking whether a target performance ratio required in service is satisfied or not when the memory page requested to be accessed is assigned to the remote memory, and predicting a size of the local memory on the basis of an LRU distance-based histogram when the target performance ratio is not satisfied.

9. The apparatus of claim 8, wherein the performance prediction unit is configured to:
check an LRU distance of the memory page requested to be accessed;
generate an LRU distance histogram by accumulating the LRU distances; and
predict the size of local memory in consideration of a relation between the LRU distance histogram and the number of times that the remote memory is accessed.

10. The apparatus of claim 8, wherein the performance prediction unit predicts the size of the local memory by performing calculation corresponding to Equation 2 below $$C=H^{-1}(N-n_t) \quad \text{[Equation 2]}$$

wherein, in Equation 2, C denotes the predicted size of the local memory, H(c) denotes an LRU distance histogram function, $N-n_t$ denotes the number of times that the remote memory is accessed to be reduced.

11. The apparatus of claim 8, wherein the performance prediction unit is configured to:
compare a ratio of application program execution time with the target performance ratio when the local memory based on a memory monitoring time period is sufficient; and
determine that the target performance ratio is satisfied when the local memory based on the memory monitoring time period is sufficient and the ratio of the application program execution time is at a value equal to or greater than the target performance ratio.

12. The apparatus of claim 8, wherein the memory hypervisor unit reassigns the memory page requested to be accessed in consideration of the predicted size of the local memory.

13. The apparatus of claim 12, wherein the memory hypervisor unit is configured to:
check a size of a remaining memory provided in the local memory;
compare the predicted size of the local memory to the size of the remaining memory; and reassign the memory page requested to be accessed to the local memory in consideration of a result of comparison between the predicted size of the local memory and the size of the remaining memory.

14. The apparatus of claim 8, wherein the memory hypervisor unit is configured to:
count an access resuming time after access to the remote memory occurs; and
reduce a size of the memory page assigned to the local memory by a predetermined size when the access resuming time exceeds a predetermined time.

15. The apparatus of claim 8, wherein the memory hypervisor unit is configured to:
monitor a usage of a virtual processor; and
reduce a size of the memory page assigned to the local memory by a predetermined size in consideration of the usage of the virtual processor.

16. An apparatus for managing a disaggregated memory, the apparatus comprising:
a disaggregated memory unit including a local memory provided in a computing device in a local area and a remote memory provided in a computing device in a remote area;
a memory virtual machine unit managing at least one memory page required to build or execute an application program; and
a memory hypervisor unit provided between the disaggregated memory unit and the memory virtual machine unit, the memory hypervisor unit configured to:
assign the at least one memory page to the local memory and the remote memory;
check a request for access to the memory page;
check whether a target performance ratio required in service is satisfied or not when the memory page requested to be accessed is assigned to the remote memory;
predict a size of the local memory on the basis of an LRU distance-based histogram when the target performance ratio is not satisfied; and
reassign the memory page requested to be accessed in consideration of the predicted size of the local memory.

* * * * *